US005158167A

United States Patent [19]

Pahl

[11] Patent Number: 5,158,167

[45] Date of Patent: Oct. 27, 1992

[54] SPIRAL ESCALATOR

[76] Inventor: Karl-Heinz Pahl, 101 Leucht Uirchweg, 4000 Düsseldorf 30, Fed. Rep. of Germany

[21] Appl. No.: 602,284

[22] PCT Filed: May 6, 1989

[86] PCT No.: PCT/DE89/00289

§ 371 Date: Nov. 8, 1990

§ 102(e) Date: Nov. 8, 1990

[87] PCT Pub. No.: WO89/10890

PCT Pub. Date: Nov. 16, 1989

[30] Foreign Application Priority Data

May 10, 1988 [DE] Fed. Rep. of Germany ....... 3815894

[51] Int. Cl.[5] ............................................ B65G 21/02

[52] U.S. Cl. .................................... 198/328; 198/333

[58] Field of Search ........................ 198/328, 778, 333

[56] References Cited

U.S. PATENT DOCUMENTS

| | | | |
|---|---|---|---|
| 723,325 | 3/1903 | Souder | 198/328 X |
| 782,009 | 2/1905 | Dodge | 198/328 X |
| 792,623 | 6/1905 | Souder | 198/328 |
| 967,710 | 8/1910 | Bennett | 198/328 X |
| 3,395,648 | 8/1968 | Karr et al. | 198/328 X |
| 3,878,931 | 4/1975 | Luna . | |
| 4,434,884 | 3/1984 | Kettle | 198/328 |
| 4,557,369 | 12/1985 | Ishida et al. | 198/333 |

FOREIGN PATENT DOCUMENTS

| | | |
|---|---|---|
| 0118813 | 9/1984 | European Pat. Off. . |
| 3301397 | 7/1984 | Fed. Rep. of Germany . |
| 3437369 | 4/1985 | Fed. Rep. of Germany . |

OTHER PUBLICATIONS

European International Search Report.

*Primary Examiner*—Joseph E. Valenza
*Attorney, Agent, or Firm*—Diller, Ramik & Wight

[57] ABSTRACT

A spiral escalator includes a plurality of stairs which are moved along a closed path of travel with the stairs collectively defining generally upwardly and downwardly moving spiral staircases bridged by upper and lower generally horizontally moving stair platforms. A generally vertical spindle is associated with each upwardly and downwardly moving spiral staircase. A male rod and female channel functions as coupling and uncoupling mechanisms for (a) coupling each stair relative to each spindle by relative vertical movement therebetween during transition movement from the upper horizontally moving stair platform to the downwardly moving spiral staircase and from the lower horizontally moving stair platform to said upwardly moving spiral staircase, and for (b) uncoupling each stair relative to each spindle by relative vertical movement therebetween during transition movement from the upwardly moving spiral staircase to the upper horizontally moving stair platform and from the downwardly moving spiral staircase to the lower horizontally moving stair platform.

16 Claims, 8 Drawing Sheets

Figure 3:
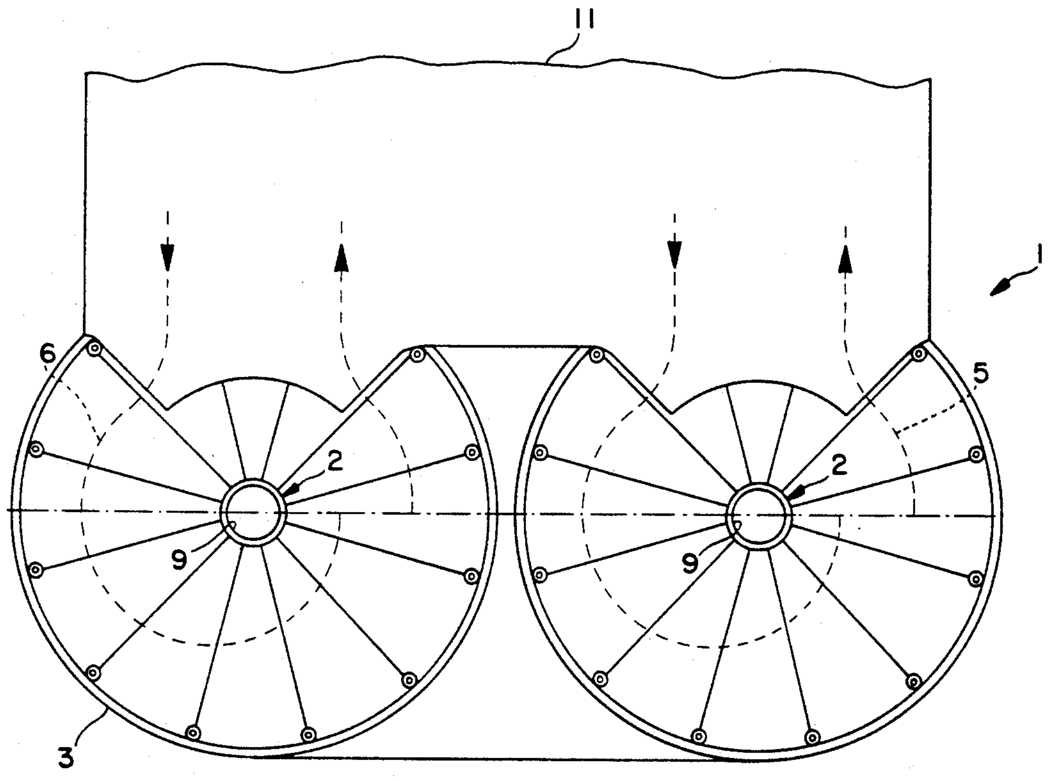

FIG. 1
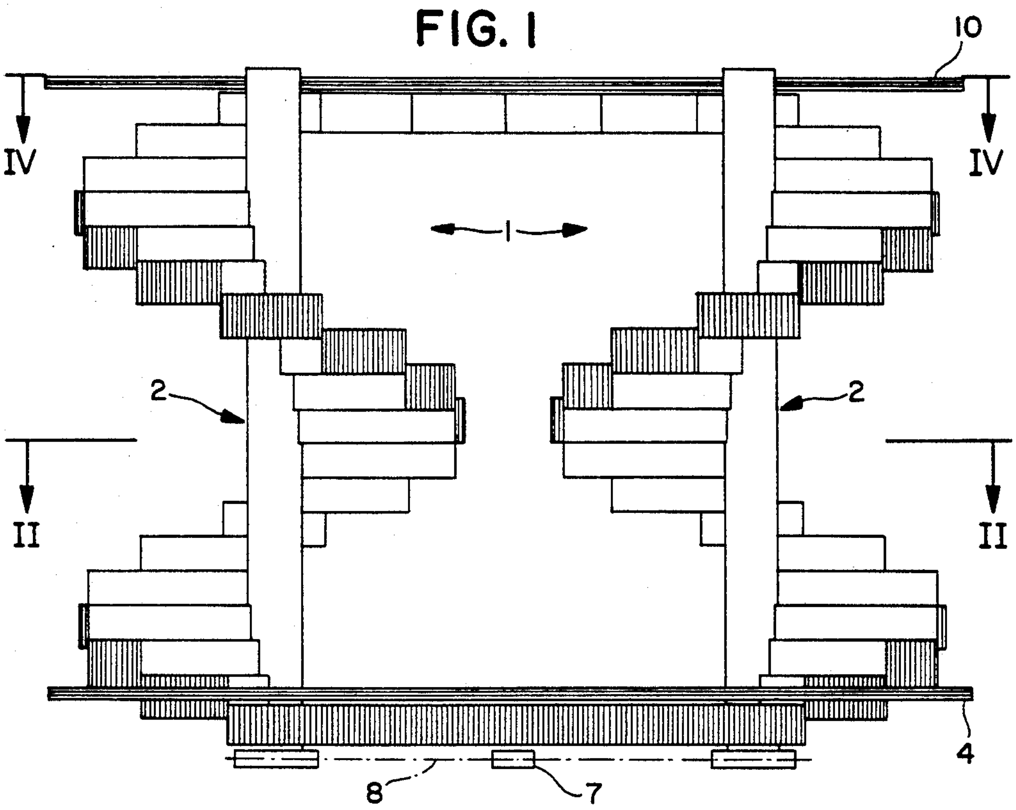
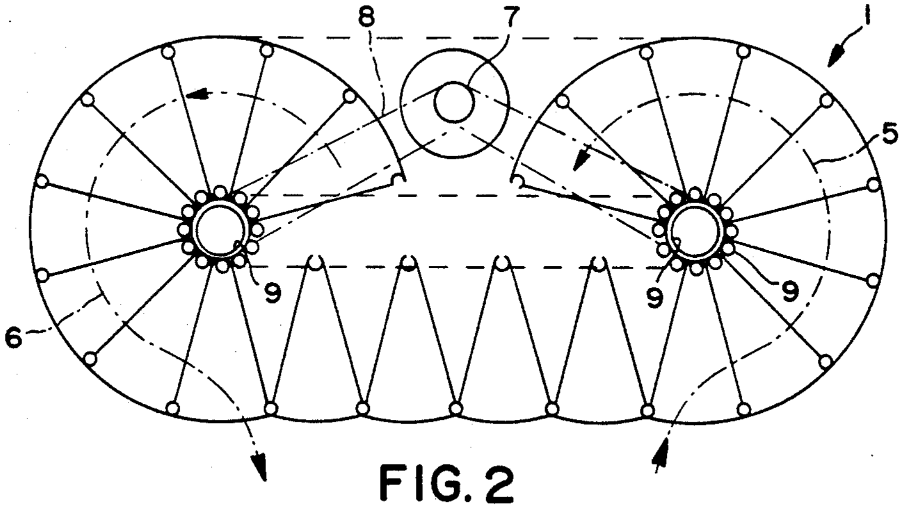
FIG. 2

FIG. 5
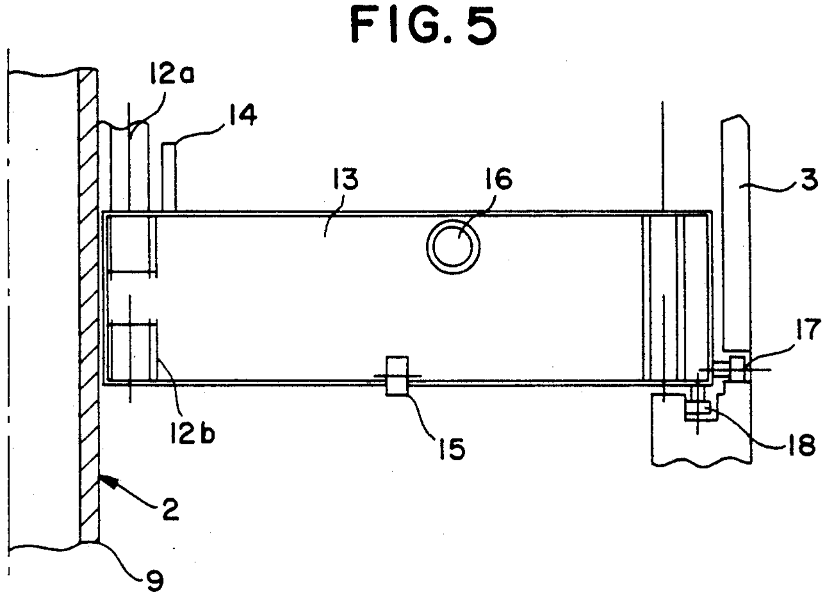
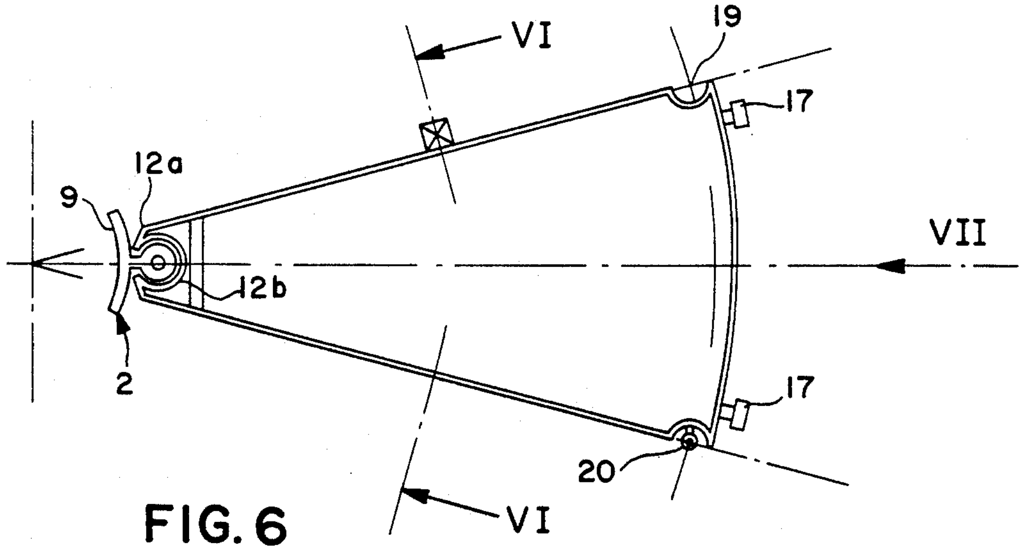
FIG. 6

FIG. 14
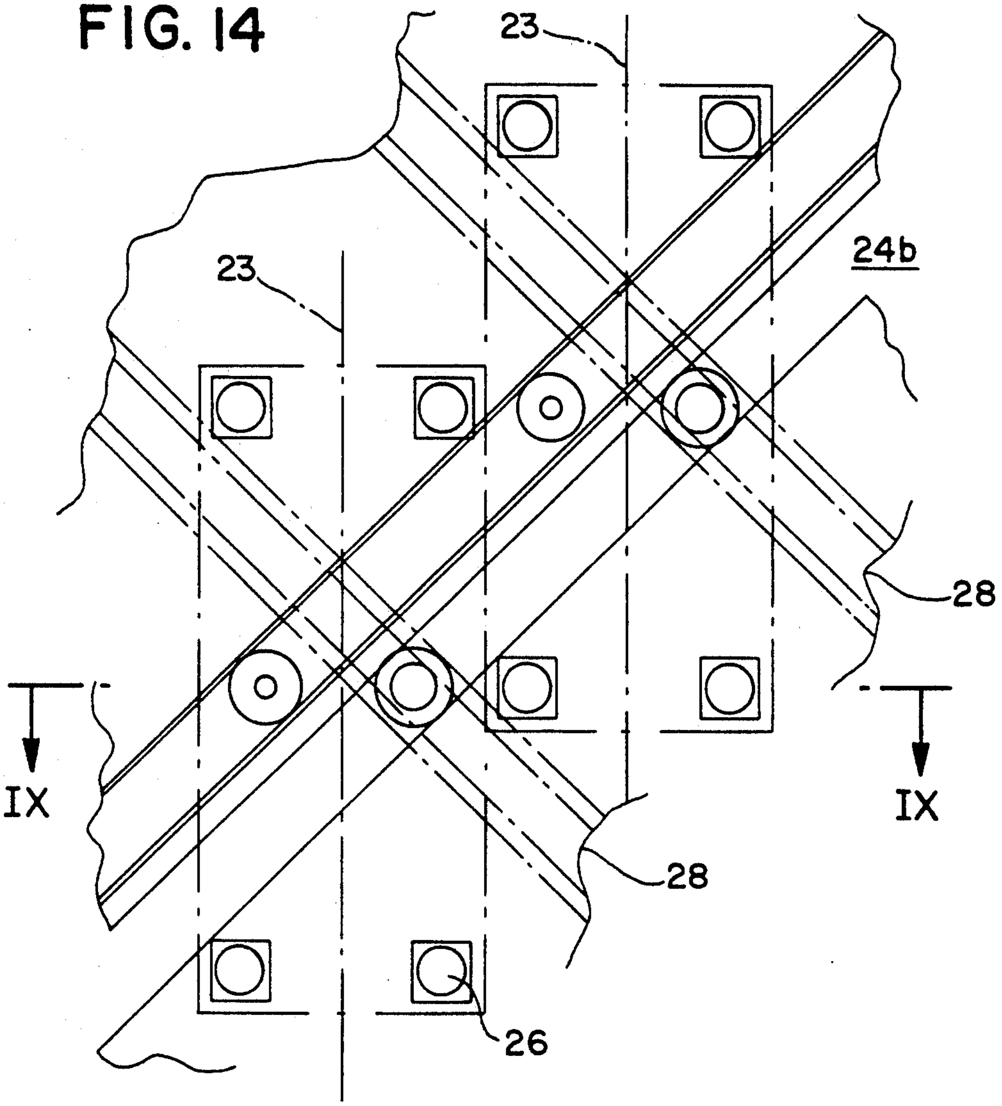
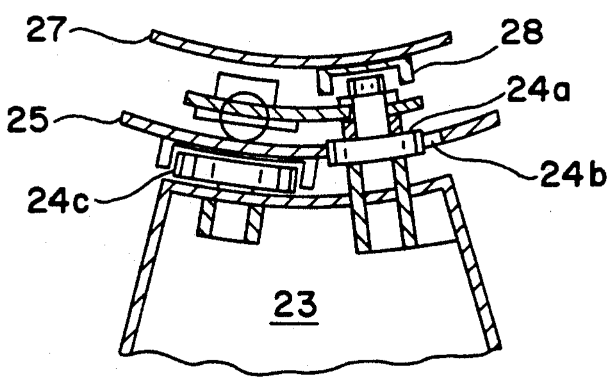
FIG. 15

SPIRAL ESCALATOR

BACKGROUND OF THE INVENTION

The invention relates to an escalator with a multitude of mobile stairs, which are connected to each other in such a way that they form an endless chain and which rotate alongside of a guide, as well as a drive for moving the stairs.

Known escalators of the type named above are straight-lined. The stairs are connected to each other at both side-ends by joints and pass at their ends across driving chain wheels. The empty escalator part is essentially guided parallel to the staircase area. Straight-lined escalators have only little flexibility with regard to their installation and have a relatively large space requirement.

Furthermore bend escalators are known, which are guided around curves with relatively large diameters, whereby the angle to be covered amounts to a maximum of 180°(DE-PS 34 41 845). Bend escalators are constructed similar to straight-lined escalators. The stairs are connected to each other at both sides by joints, whereby the length of the joint parts are adjusted to the bendline. The empty part of the escalator is guided back below the bend. Although new kinds of staircase guideways can be realized with such bend escalators, they also have a relatively large space requirement.

SUMMARY OF THE INVENTION

Object of the invention is to provide an escalator, which can be placed within the narrowest possible space, without loss of any of the advantages of the known escalators.

This problem is solved according to the invention in that the escalator is guided like a spiral staircase, that the stairs have steps which are spaced like a sector of a circle, that only the broader, outer side-ends of the stairs are coupled with the respective adjacent stairs by connecting elements, which permit pivoting of the stairs relative to each other around an approximately vertical axis and furthermore an approximately vertical shift of the stairs relative to each other, that the stairs in the staircase area pass across at least one stationary, spiral type guide, that in the center of the staircase area a vertical central column is arranged, that in the peripheral area of the central column a coupling device is provided for the detachable holding facility and guidance of the small side ends of the stairs and that at least the coupling device of the column is rotatory around the axis of the column.

The inventive spiral escalator is very versatile with regard to the possibilities of its application and is relatively simple in its construction compared to known escalators. It exhibits all advantageous features of known staircases and is in addition beneficial to its user, since it represents a smaller risk of accident for tumbling persons, because the closed outer periphery alleviates tumbling and slipping across a longer staircase area.

The inventive spiral escalator can be constructed as a simple upwardly directed staircase or as a simple downwardly directed staircase. The empty part of the escalator is guided in this case space-saving through the inner space of the central column, which is designed accordingly.

Preferably a staircase directed upwardly is combined with a staircase directed downwardly, whereby the stairs of both staircases form an endless chain. For both staircases, which exhibit a separate central column respectively, only one drive is necessary.

The two central columns of the staircase directed upwardly and of the staircase directed downwardly are suitably arranged close to each other with the result that the chain formed by the individual stairs can be kept relatively short. Such double staircase can be constructed as a compact unit, which can be attached outside to buildings as a tower. A subsequent erection of such a unit is readily possible. The construction of such tower-like units can also readily be carried out across several floors.

In addition the inventive spiral escalator is well suited in particular with regard to its little space requirement and low price also for one family houses, for road overpasses or road underpasses, which are in particular to be installed in areas of narrow sidewalks, at booths at fairs etc.

By variation of the height of the stairs and/or gradient of the spiral, the spiral escalator can be adapted to any height of a storey.

The stairs suitably have a case-like construction, in such a way that they on the one hand are self-supporting and on the other hand cover the vertical area between the stairs, in order to avoid the risk of squeezing for the user.

The connecting elements which are provided at the broad side-ends of the stairs may consist of a vertical guiding bolt each provided at one stair and a sliding claw each embracing the guiding bolt by more than 180° arranged at the other stair. Such a connection offers the possibility of pivoting as well as of a vertical shift of the stairs relative to each other.

At the outer, broad side-ends of the stairs preferentially in the case of very broad stairs supporting rolls with a horizontal axis of rotation are provided, which pass across the stationary spiral-like guidance. With the aid of these supporting rolls the stairs are fixed within the lifting area in a horizontal position.

Furthermore additional guiding rolls can be provided at the other, broad side-ends of the stairs with an approximately vertical axis which rest against at least one side-guiding. These guiding rolls in particular serve for guiding the stairs in the plane.

Furthermore additional supporting rolls can be provided below the medium area of the stairs which rest on suitable guiding lines at least in the areas of acceleration and delay as well as in horizontal areas.

Between adjacent stairs suitably a tooth system may be provided at the vertical stair walls, as a result of which the direction of the stairs relative to each other is positively effected, whereby the safety with regard to possible squeezing is positively affected.

In addition on the step surfaces of the stairs an additional circle-like tooth system may be provided.

At the front sides and back sides of the stairs preferably in the case of very broad stairs telescope-like supporting bolts may be provided somewhat below the step surfaces. In the staircase area the respectively higher step can be supported by these supporting bolts at its bottom side during its movement upward and downward. By this construction a stable guiding of the staircase is attained.

It is possible to dispense eventually with separate hand rail strips, which as a rule need an additional drive of their own. Instead handles can be provided which are mounted in a fixed position at the outer and/or inner edge of the step surface of each stair.

In a preferred embodiment of the spiral escalator the coupling device, which serves for holding and guiding the inner side-ends of the stairs, may be attached to the central column, whereby the central column is drivable and thus forms at the same time the drive of the spiral escalator. The drive of the central column may thereby act on the upper or lower end of the spiral escalator.

In the case of this embodiment the column coupling device may be formed by vertical guide bars or other suitable guides, which are arranged uniformly in accordance with the distances between the stairs around the circumference of the column, whereby the stairs exhibit an open claw each at their smaller side-end, which is threadable on the guide bar or guide from below in the case of the staircase directed upwardly, and from above in the case of the staircase directed downwardly.

Alternatively the central column may be arranged stationarily and exhibit a screw-like guiding slit corresponding to the gradient of the staircase, whereby inside of the central column a pivotable drive spindle is arranged with screw-flights, or screw-like drive bars which extend counterrotating to the guiding slit. At the narrower side-ends of each stair a catch member may be arranged which interacts with the respective screw-flight, or the respective drive bar and which acts through the guiding slit.

According to a further embodiment a hoisting unit of the pilgrim step type which works hydraulically or pneumatically may be arranged at the foot end of the central column and may directly act as a drive on the individual stairs.

In the case of spiral escalators, which are intended to connect more than two floors, the stairs may be divided in two parts across their width, whereby only the outer parts of the stairs in the entering and leaving areas are provided with acceleration and delay sections with the aid of corresponding cams. Persons which intend to be transported across several floors choose the internal staircase area which carries out a continuous lifting motion between the individual floors. In order to leave the staircase one then moves to the outer staircase area and leaves this area in its delay section.

The inventive spiral escalator may as a consequence of its relatively simple construction be at least in part constructed by using plastics. As a result numerous possibilities of constructive and color designs are available. As an outer limitation of the staircase, metal or plastic tubing respectively double tubing can be applied. In the case of attachment of the spiral escalator to an outer or internal front plexiglass is a suitable material for the outer tubing which permits the user to look to the outside.

BRIEF DISCRIPTION OF THE DRAWING

Figure 4:
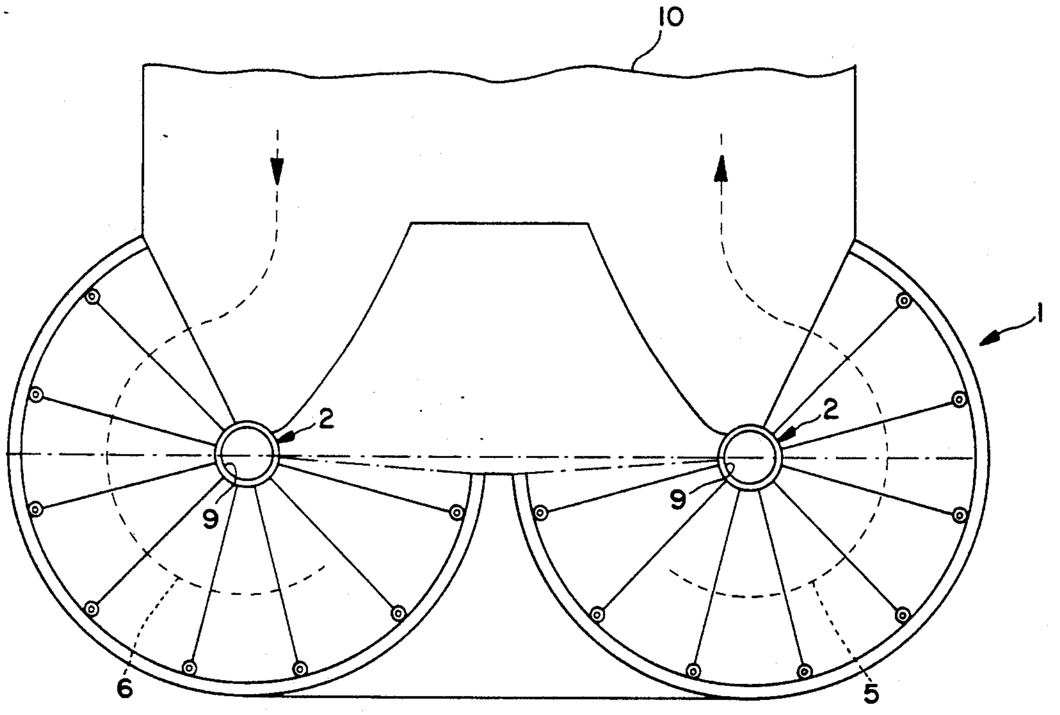
Figure 7:
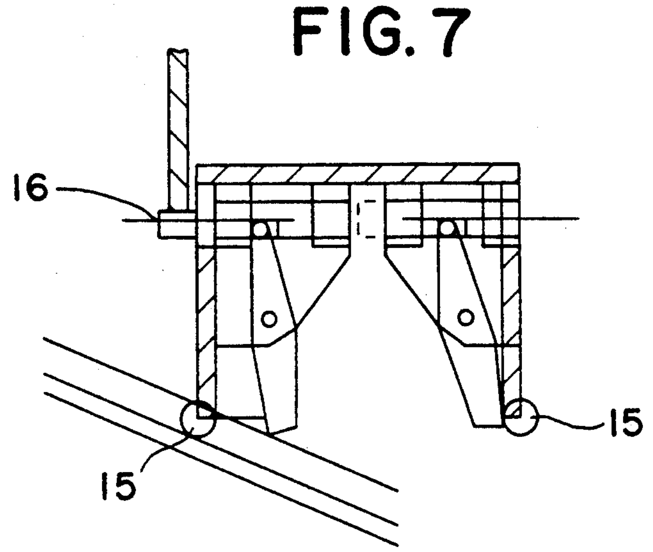
Figure 8:
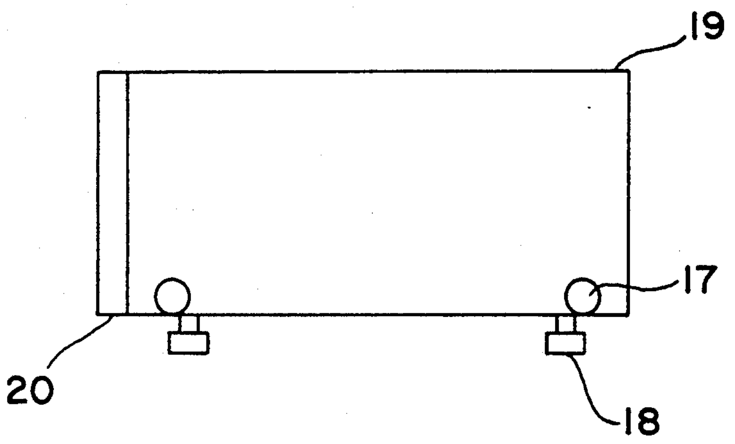
Figure 9:
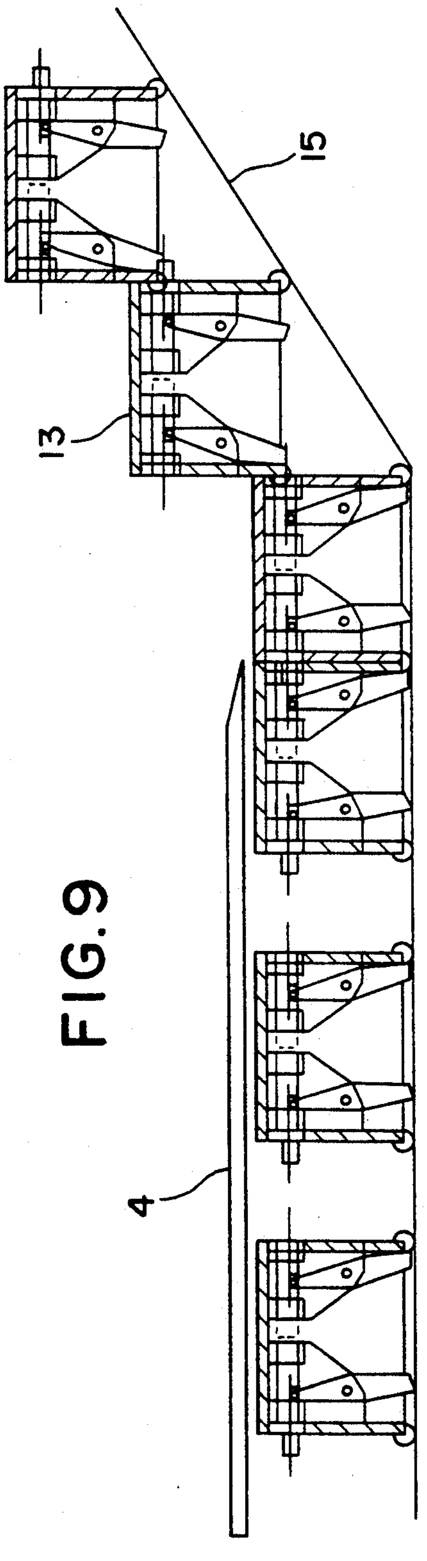
Figure 10:
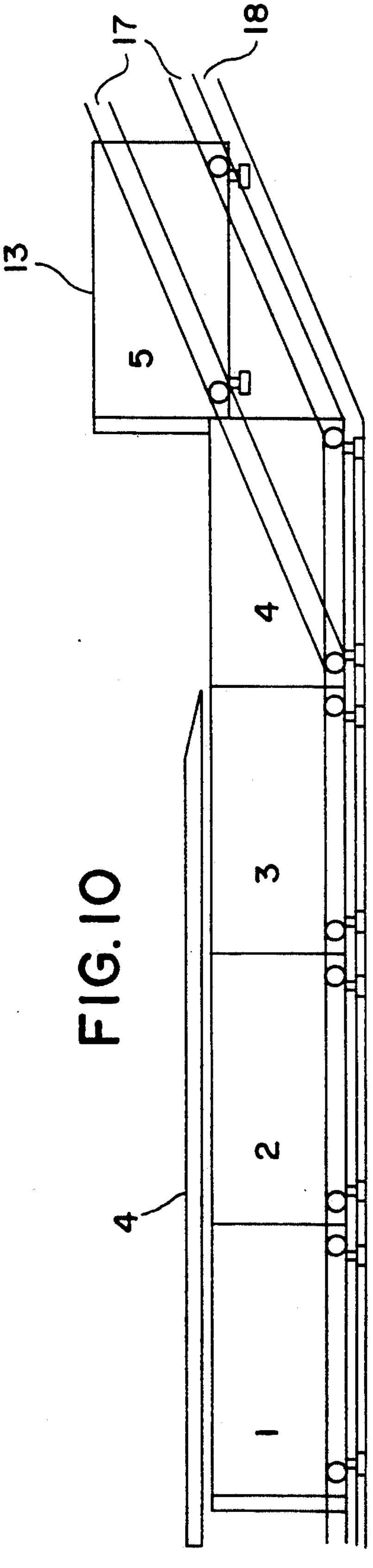
Figure 11:
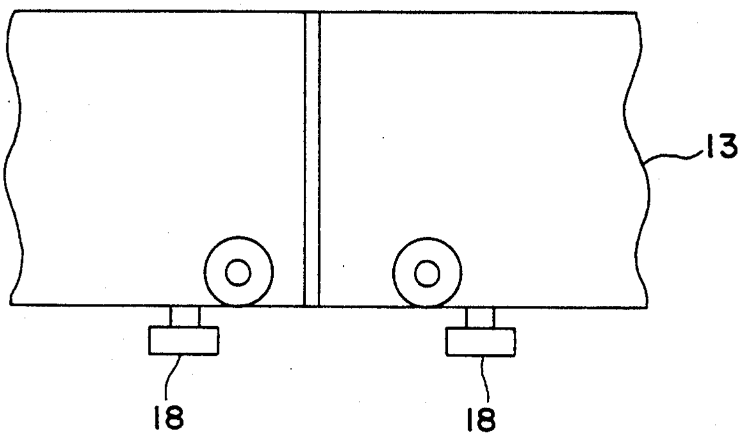
Figure 12:
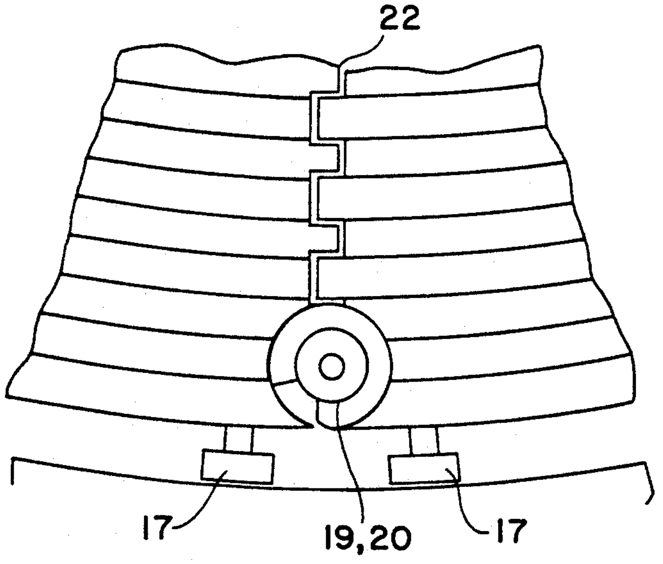
Figure 13:
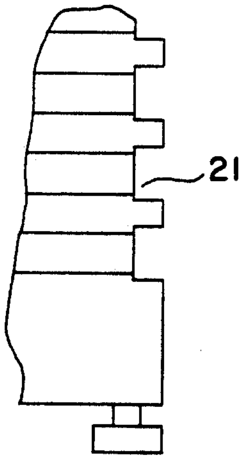

The invention is illustrated by way of example in the drawing and described in detail below with reference to the drawing, in which FIG. 1 illustrates a schematic side view of a combined staircase directed upwardly and downwardly, FIG. 2 is a cross-section II—II out of FIG. 1, FIG. 3 shows an intersection through the spiral escalator according to FIG. 1 at the height of an intermediate stage, FIG. 4 is a cross-sectional view taken along line IV—IV of FIG. 1, FIG. 5 illustrates a side view of an individual stair, FIG. 6 illustrates a top view of an individual stair, FIG. 7 is a cross-sectional view taken generally along line VI—VI of FIG. 6, FIG. 8 is a view taken looking in the direction of the arrow VII of FIG. 6, FIG. 9 illustrates an unwinding area of a spiral escalator of a particular radius close to a starting area of an associated staircase, FIG. 10 illustrates another unwinding area of a spiral escalator of a different radius than that shown in FIG. 9, FIG. 11 is a fragmentary end elevational view of a pair of adjacent stairs showing a pair of rollers carried by each stair, FIG. 12 is a fragmentary top plan view of a pair of stairs of FIG. 11, and illustrates coupling means and tongue and groove means therebetween, FIG. 13 is a fragmentary top plan view of one of stairs of FIGS. 11 and 12, and illustrates the tongues and grooves thereof, FIG. 14 is a fragmentary side view of another spindle, and illustrates a pair of stairs in dash lines associated therewith, and FIG. 15 is a cross-sectional view taken generally along line IX—IX of FIG. 14, and illustrates the manner in which one of each of the stairs is driven by means of its associated post including an innermost rotary spindle and a stationary outer tubing having a spiral slit associated with a roller carried by each stair.

In FIGS. 1 to 4 of the drawing, a spiral escalator 1 is represented with two stair spindles 2. The unit is surrounded by a fixed railing 3. Entering and leaving takes place at the height of a lower generally horizontal stage or platform 4 as well as of a generally horizontal upper stage or platform 10. Naturally any intermediate stages 11 can be provided as presented in FIG. 3.

The spindle at the right side is related to a stair or staircase 5 directed upwardly and the left hand spindle is related to a staircase or stair 6 directed downwardly.

For both spindles 2 a common drive engine 7 is provided, which is installed below the level of the lower stage 4. Spindles 2 consist of rotatable tubings 9, which are seated on stationary guides and which are powered by chain drives 8 by a common engine 7.

FIGS. 5, 6 and 7 represent in detail an individual stair 13. The step surface respectively the layout are formed like a sector of a circle, whereby the top has been neglected however with regard to the central tubing 9.

A male and female coupling and uncoupling means or device is formed by male-coupling members, pins or round bars 12*a* which functions as internal holding and guiding means for the stairs 13. The round bars 12*a*, which are vertically arranged, are attached to tubing 9. The internal side-ends of the stairs 13 also include the male and female coupling and uncoupling means in the form of grooves, channels or open ball cases 12*b*, which overlap with the round bars 12*a*. In the entering sections the ball cases 12*b* are threaded onto the respective upper or lower ends of the round bars 12*a*, and in the leaving sections they are separated again from the round bars.

At the outer, broad side-ends of each stair 13 radially arranged guiding means or guiding rolls 17 are provided, which act on corresponding guiding means or guiding grooves (unnumber) of the sidewalls or on screw-like guided curve orbits . These horizontal guiding rolls 17 serve to keep the stairs in a horizontal position.

In addition at least one guiding means or guiding roll 18 with a vertical axis of rotation is arranged in the outer area of each stair. The guiding roll 18 serves in particular to guide the stair horizontally.

The broad side-ends of the stairs 13 are coupled to each other by male and female coupling means in the form of pivotable connections, which also allow a vertical shift. In the example presented, the pivotable connections or male and female coupling means consist each of a vertical bolt or pin 20 as well as of a bolt guiding or groove 19, which is pivotably seated on bolt 20. Guiding 19 can slide in a vertical direction on bolt 20.

In the central area of each stair 13 a supporting means or supporting bolt 16 (FIGS. 5 and 6) with a crank arm (unnumbered) is provided at the front side and back side. In the areas of the staircase directed upwardly and downwardly the supporting bolts 16 are extended and serve as support for the stair in the adjacent higher position. The crank arm (unnumbered) of the supporting bolt 16 is moved with the aid of a cam 15.

At each stair within the internal and/or outer area a handle 14 can be provided, which extends upwardly beginning at the step surface. The handles 14 may form a grip rail continuously extending from stair to stair.

Operation of the escalator described is illustrated in FIGS. 9 and 10.

The individual stairs 13 are directed tangentially towards the rotary tubing 9 as represented in FIG. 2 by a view from above. In this horizontal position the individual stairs 13 are driven by the outer connecting joints, which connect all of the stairs by an endless chain to each other.

When the individual stairs approach the rotary tubing 9 the open ball cases 12*b*, which are provided at the internal side-ends of the stairs 13, are automatically adjusted in the direction to the lower ends of the round bars 12*a*, which are, for example, located in the area of the lower entering plane somewhat above of the respective lower stair. In FIGS. 9 and 10 exemplarily stair No. 3 is adjusted in the direction to the corresponding round bar 12*a*. If this stair No. 3 is somewhat lifted by the curve line, ball case 12*b* is threaded automatically onto the lower end of round bar 12*a* and is fixed, guided and driven by this round bar and finally automatically arrives in positions No. 4, 5 and the following positions, until it detaches at the upper end at the height of the upper stage from round bar 12*a* and is transferred into the horizontal guiding.

In FIG. 11 of the drawing details are illustrated of stairs 13, particularly a circular crest tooth means or system 21 of the step surface as well as a circular crest tooth means or system 22 at the respective stair wall.

In FIG. 14 a different embodiment of the drive of the stair is presented. Stairs 23, in particular the internal side-end of which, are adjusted correspondingly to the modified drive.

The central spindle consists of a stationary outer tubing 25, which exhibits a spiral-type guiding means or slit 24*b* corresponding to the gradient of the spiral staircase. In guiding slit 24*b* guiding means or rolls 24*a* are operating, which are seated in extensions of stairs 23.

Extensions 24*c* of the guide rollers 24*a* project radially inwardly beyond the stationary outer tubing 25 and are driven by an internal drive tube or post 27, which is provided with a curved cam 28 counterrotating with respect to the guiding slit 24*b*, whereby each of the individual stairs 23 is related to a particular curve line 28.

With respect to a reliable guiding of the individual stairs, additionally guiding means or rolls 24*c* are provided, which operate at the outer wall of the stationary tube 25.

In addition ball rolls 26 are provided at each stair 23, which roll alongside the internal wall and the external wall of the stationary outer tubing 25 and which effect reliable guiding of each individual stair 23.

I claim:

1. A spiral escalator comprising a plurality of stairs, means for moving said plurality of stairs along a closed path of travel, said stairs collectively defining generally upwardly and downwardly moving spiral staircases bridged by upper and lower generally horizontally moving stair platforms, a generally vertical spindle associated with each upwardly and downwardly moving spiral staircase, male and female coupling and uncoupling means for (a) coupling each stair relative to each spindle by relative vertical movement therebetween during transition movement from said upper horizontally moving stair platform to said downwardly moving spiral staircase and from said lower horizontally moving stair platform to said upwardly moving spiral staircase, and for (b) uncoupling each stair relative to each spindle by relative vertical movement therebetween during transition movement from said upwardly moving spiral staircase to said upper horizontally moving stair platform and from said downwardly moving spiral staircase to said lower horizontally moving stair platform, and male and female coupling means for coupling all adjacent stairs to each other for relative pivotal movement about a vertical axis during movement of said stairs along said entire closed path of travel.

2. The spiral escalator as defined in claim 1 wherein said coupling and uncoupling means includes vertically engageable and disengageable pins and grooves carried one by said stairs and the other by said spindles.

3. The spiral escalator as defined in claim 1 wherein said male and female coupling means includes a vertically engageable and disengageable pin and groove carried by each of said stairs.

4. The spiral escalator as defined in claim 1 wherein said coupling and uncoupling means includes vertically engageable and disengageable pins and grooves carried one by said stairs and the other by said spindles.

5. The spiral escalator as defined in claim 1 wherein each spindle includes an inner rotatable post in internal telescopic relationship to an outer stationary tube, said moving means is constructed and arranged for rotating said posts, and means for driving said stairs through the rotation of said posts.

6. The spiral escalator as defined in claim 1 wherein each spindle includes an inner rotatable post in internal telescopic relationship to an outer stationary tube, said moving means is constructed and arranged for rotating said posts, means for driving said stairs through the rotation of said posts, and means between each stair and each outer stationary tube for effecting spiral guidance of the staircases relative to said spindles.

7. The spiral escalator as defined in claim 1 wherein each spindle includes an inner rotatable post in internal telescopic relationship to an outer stationary tube, said moving means is constructed and arranged for rotating said posts, means for driving said stairs through the rotation of said posts, means between each stair and each outer stationary tube for effecting spiral guidance of the staircases relative to said spindles, and said spiral guidance means includes a guide roller carried by each stair guided in a spiral guide channel of each spindle.

8. The spiral escalator as defined in claim 1 wherein each spindle includes an inner rotatable post in internal telescopic relationship to an outer stationary tube, said moving means is constructed and arranged for rotating said posts, means for driving said stairs through the rotation of said posts, means between each stair and each outer stationary tube for effecting spiral guidance of the staircases relative to said spindles, said spiral guidance means includes a guide roller carried by each stair guided in a spiral guide channel of each spindle, and each spiral guide channel is a slot opening through each outer stationary tube.

9. The spiral escalator as defined in claim 1 wherein each spindle includes an inner post in inner telescopic relationship to an outer stationary tube, and means for effecting spiral guidance between each stair and each of said outer stationary tubes.

10. The spiral escalator as defined in claim 1 wherein each spindle includes an inner post in inner telescopic relationship to an outer stationary tube, means for effecting spiral guidance between each stair and each of said outer stationary tubes, and said spiral guidance means includes a guide roller carried by at least selected ones of said stairs guided in a spiral guide channel of each spindle.

11. The spiral escalator as defined in claim 1 wherein each stair is of a generally truncated triangular configuration defined by a narrow end adjacent each spindle and a broader end remote from each spindle when moving upwardly and downwardly relative thereto, each stair at its broader end carrying first and second rollers having respective generally horizontal and vertical axes of rotation, means for effecting running support and guiding support respectively for said first and second rollers, a third roller beneath each stair mounted for rotation about a generally horizontal axis, and means for effecting running support for said third roller.

12. The spiral escalator as defined in claim 1 wherein each stair is of a generally truncated triangular configuration defined by a narrow end adjacent each spindle and a broader end remote from each spindle when moving upwardly and downwardly relative thereto, each stair at its broader end carrying first and second rollers having respective generally horizontal and vertical axes of rotation, means for effecting running support and guiding support respectively for said first and second rollers, a third roller beneath each stair mounted for rotation about a generally horizontal axis, means for effecting running support for said third roller, and said third roller is supported generally medially between the narrow and broader ends of its associated stair.

13. A spiral escalator as defined in claim 1 including extendable and retractable means carried by each stair for supporting a higher positioned stair by the next lower adjacent stair.

14. A spiral escalator as defined in claim 1 including extendable and retractable means carried by each stair for supporting a higher positioned stair by the next lower adjacent stair, and means for selectively extending and retracting said extendable and retractable means.

15. A spiral escalator as defined in claim 1 including extendable and retractable means carried by each stair for supporting a higher positioned stair by the next lower adjacent stair, means for selectively extending and retracting said extendable and retractable means, and said selectively extending and retracting means includes a bell-crank lever.

16. A spiral escalator as defined in claim 1 including extendable and retractable means carried by each stair for supporting a higher positioned stair by the next lower adjacent stair, means for selectively extending and retracting said extendable and retractable means, and said selectively extending and retracting means includes a bell-crank lever operated by cam.

* * * * *